(12) United States Patent
Liu et al.

(10) Patent No.: US 11,945,202 B2
(45) Date of Patent: Apr. 2, 2024

(54) CURVED SURFACE LAMINATION DEVICE

(71) Applicants: Chengdu BOE Optoelectronics Technology Co., Ltd., Sichuan (CN); BOE Technology Group Co., Ltd., Beijing (CN)

(72) Inventors: Xingguo Liu, Beijing (CN); Wei Qing, Beijing (CN); Qiang Tang, Beijing (CN); Shaokui Liu, Beijing (CN); Wenwei Mo, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,879

(22) PCT Filed: May 12, 2021

(86) PCT No.: PCT/CN2021/093282
§ 371 (c)(1),
(2) Date: Oct. 27, 2022

(87) PCT Pub. No.: WO2021/254034
PCT Pub. Date: Dec. 23, 2021

(65) Prior Publication Data
US 2023/0166491 A1 Jun. 1, 2023

(30) Foreign Application Priority Data
Jun. 18, 2020 (CN) .......................... 202010559363.4

(51) Int. Cl.
*B32B 41/00* (2006.01)
*B32B 37/00* (2006.01)

(52) U.S. Cl.
CPC ...... *B32B 37/0046* (2013.01); *B32B 2457/20* (2013.01)

(58) Field of Classification Search
CPC ............ B32B 37/0046; B32B 2457/20; B32B 37/003; B32B 37/12; B32B 38/1866; G06F 9/301; H10K 59/10; H10K 71/00
(Continued)

(56) References Cited

U.S. PATENT DOCUMENTS

2016/0202728 A1 7/2016 Kim
2022/0063179 A1\* 3/2022 Zhang ................ B32B 38/1866

FOREIGN PATENT DOCUMENTS

CN 108597375 A 9/2018
CN 108615466 A 10/2018
(Continued)

OTHER PUBLICATIONS

CN202010559363.4 first office action.
PCT/CN2021/093282 international search report.

*Primary Examiner* — Michael N Orlando
*Assistant Examiner* — Joshel Rivera
(74) *Attorney, Agent, or Firm* — IPro, PLLC (57) ABSTRACT

A curved surface lamination device, comprising a profiling jig (01), the profiling jig (01) comprising a base (101) and a profiling portion (102), with the profiling portion (102) being configured to support a carrier film (02), and the side of the base (101) facing away from the profiling portion (102) being provided with an opening; and a lower jig (03), comprising a first sinking groove (301), with part of the base (101) being inserted into the first sinking groove (301), such that the lower jig (03) encloses a hollow structure (E) with the base (101) at the opening position.

20 Claims, 11 Drawing Sheets

(58) Field of Classification Search
USPC .................... 156/60, 64, 350, 351, 378, 379
See application file for complete search history.

(56) References Cited

FOREIGN PATENT DOCUMENTS

| | | | | |
|---|---|---|---|---|
| CN | 108693998 A | | 10/2018 | |
| CN | 209216462 U | | 8/2019 | |
| CN | 110861290 A | * | 3/2020 | ......... B29C 63/0047 |
| CN | 111682128 A | | 9/2020 | |

\* cited by examiner

CURVED SURFACE LAMINATION DEVICE

CROSS REFERENCE TO RELATED APPLICATIONS

The present disclosure is a National Stage of International Application No. PCT/CN2021/093282, filed on May 12, 2021, which claims priority to Chinese Patent Application No. 202010559363.4, the entire contents of which are incorporated herein by reference.

FIELD

The present disclosure relates to the technical field of display, in particular to a curved surface lamination apparatus.

BACKGROUND

With the development of a display technology, curved surface organic electroluminescent display (3D OLED) apparatuses are widely used. A curved surface lamination process (also known as a 3D lamination process) is a key technology to realize the assembly of an OLED display panel and a curved surface cover plate into a display product. Its reliability and accuracy determine the yield of the display product, and directly affect the cost of the product.

SUMMARY

An embodiment of the present disclosure provides a curved surface lamination apparatus, including: a profiling jig, including: a base and a profiling portion, wherein the profiling portion is configured to support a carrier film, and a side of the base facing away from the profiling portion has an opening; and a lower jig, including: a first sinking groove, wherein part of the base is inserted into the first sinking groove, such that the lower jig encloses a hollow structure with the base at a position of the opening.

Optionally, in the above curved surface lamination apparatus provided by the embodiment of the present disclosure, in a direction perpendicular to a plane where the lower jig is located, a ratio of a thickness of the hollow structure to a thickness of the profiling jig is in a range of 6:17 to 7:13.

Optionally, in the above curved surface lamination apparatus provided by the embodiment of the present disclosure, the lower jig further includes: a side edge on one side of the first sinking groove away from a central area of the lower jig; and an extension direction of the side edge is the same as an extension direction of the first sinking groove, and the side edge is configured to carry the profiling portion.

Optionally, in the above curved surface lamination apparatus provided by the embodiment of the present disclosure, the lower jig further includes: a dovetail edge, including: a first dovetail portion and a second dovetail portion, wherein a contact surface between the first dovetail portion and the second dovetail portion is smaller than a surface of the first dovetail portion facing away from the contact surface and is smaller than a surface of the second dovetail portion facing away from the contact surface; the side edge includes: a dovetail groove matched with the first dovetail portion, and a defining edge on one side of the dovetail groove away from the central area of the lower jig; and the profiling portion includes: a bending portion exceeding a border of the base, wherein the bending portion includes a first bending portion matched with the second dovetail portion, and a second bending portion on one side of the first bending portion away from the base and being in contact with the defining edge.

Optionally, in the above curved surface lamination apparatus provided by the embodiment of the present disclosure, in a direction perpendicular to the plane where the lower jig is located, a ratio of a thickness of the bending portion to a thickness of the profiling jig is in a range of 6:17 to 9:13.

Optionally, in the above curved surface lamination apparatus provided by the embodiment of the present disclosure, the surface of the first dovetail portion facing away from the contact surface is smaller than the surface of the second dovetail portion facing away from the contact surface.

Optionally, in the above curved surface lamination apparatus provided by the embodiment of the present disclosure, the second dovetail portion includes: a plane facing away from one side of the dovetail groove, and side faces on two sides of the plane in the extension direction of the first sinking groove and extending away from the plane.

Optionally, in the above curved surface lamination apparatus provided by the embodiment of the present disclosure, the side faces are inclined faces or cambered faces.

Optionally, in the above curved surface lamination apparatus provided by the embodiment of the present disclosure, the second dovetail portion includes a second sinking groove; and an orthographic projection of the second sinking groove on the plane where the lower jig is located partially overlaps with an orthographic projection of the plane of the second dovetail portion on the plane where the lower jig is located, and partially overlaps with an orthographic projection of the side face close to the side of the central area of the lower jig on the plane where the lower jig is located.

Optionally, in the above curved surface lamination apparatus provided by the embodiment of the present disclosure, in the extension direction of the first sinking groove, a central line of the second dovetail portion is away from the central area of the lower jig relative to a central line of the second sinking groove.

Optionally, in the above curved surface lamination apparatus provided by the embodiment of the present disclosure, in the extension direction of the first sinking groove, the second sinking groove is in a middle area of the second dovetail portion, and an extension length of the second sinking groove is smaller than an extension length of the second dovetail portion.

Optionally, in the above curved surface lamination apparatus provided by the embodiment of the present disclosure, the lower jig further includes: a first sliding top block; and in the extension direction of the first sinking groove, the first sliding top block is at two ends of the dovetail groove and in contact with the dovetail edge.

Optionally, in the above curved surface lamination apparatus provided by the embodiment of the present disclosure, the lower jig further includes: a fixed bolt, and the fixed bolt is configured to fix the first sliding top block to the side edge; and an orthographic projection of the profiling jig on the plane where the lower jig is located does not overlap with an orthographic projection of the first sliding top block on the plane where the lower jig is located and an orthographic projection of the fixed bolt on the plane where the lower jig is located.

Optionally, in the above curved surface lamination apparatus provided by the embodiment of the present disclosure, the dovetail edge is detachably connected to the dovetail groove.

Optionally, in the above curved surface lamination apparatus provided by the embodiment of the present disclosure, an orthographic projection of the profiling jig on the plane where the lower jig is located is reduced inwards by a first distance relative to an orthographic projection of a flexible panel on the plane where the lower jig is located.

Optionally, in the above curved surface lamination apparatus provided by the embodiment of the present disclosure, the first distance is in a range of 1 mm-3 mm.

Optionally, in the above curved surface lamination apparatus provided by the embodiment of the present disclosure, in an extension direction of the first sinking groove, the bending portion is reduced inwards by a second distance relative to the base.

Optionally, in the above curved surface lamination apparatus provided by the embodiment of the present disclosure, the second distance is in a range of 1 mm-3 mm.

Optionally, in the above curved surface lamination apparatus provided by the embodiment of the present disclosure, the lower jig further includes: a second sliding top block; and in the extension direction of the first sinking groove, the second sliding top block is at two ends of the first sinking groove and in contact with the base.

Optionally, in the above curved surface lamination apparatus provided by the embodiment of the present disclosure, the lower jig includes: an irregular-shaped groove; and an orthographic projection of the irregular-shaped groove on the plane where the lower jig is located is expanded outwards by a third distance compared with an orthographic projection of an irregular-shaped area of a flexible panel on the plane where the lower jig is located.

Optionally, in the above curved surface lamination apparatus provided by the embodiment of the present disclosure, the second the third distance is in a range of 0.2 mm-0.3 mm.

Optionally, the above curved surface lamination apparatus provided by the embodiment of the present disclosure further includes: an upper jig, configured to fix a curved surface cover plate, wherein the curved surface cover plate is used for being laminated with the flexible panel.

Optionally, the above curved surface lamination apparatus provided by the embodiment of the present disclosure further includes the carrier film, configured to attach the flexible panel, wherein an initial bending angle of the carrier film is greater than a bending angle of the curved surface cover plate.

DETAILED DESCRIPTION OF THE EMBODIMENTS

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. The thicknesses and shapes of all film layers in the accompanying drawings do not reflect true scales, and are only intended to schematically illustrate the contents of the present disclosure. Apparently, the described embodiments are only a part of the embodiments of the present disclosure, not all of the embodiments. Based on the described embodiments of the present disclosure, all other embodiments obtained by those of ordinary skill in the art without creative work shall fall within the protection scope of the present disclosure.

Unless otherwise defined, technical or scientific terms used herein shall have the ordinary meanings understood by those ordinarily skilled in the art to which the present disclosure pertains. The words "first", "second" and the similar words used in specification and claims of the present disclosure do not indicate any order, quantity or importance, but are merely used to distinguish different components. The words "comprise" or "include" and the like indicate that an element or item appearing before such word covers listed elements or items appearing after the word and equivalents thereof, and does not exclude other elements or items. "Inner", "outer", "upper" and "lower" and the like are only used to represent relative position relationships, and the relative position relationships may also change accordingly after an absolute position of a described object is changed.

A curved surface (3D) lamination process specifically refers to: a flexible panel is bonded to a curved surface cover plate through an optical clear adhesive (OCA) through a curved surface lamination apparatus. At present, there are two schemes of roller and silicon substrate for the curved surface lamination apparatus. The roller scheme is more suitable for plane lamination, and for curved surface lamination, there is a problem of insufficient stiffness. The existing silicon substrate scheme has a problem of uncontrolled local lamination stress, which leads to insufficient stress at the four corners of the silicon substrate and stress concentration in the middle area in the lamination process, and is prone to failure of lamination.

Figure 1:
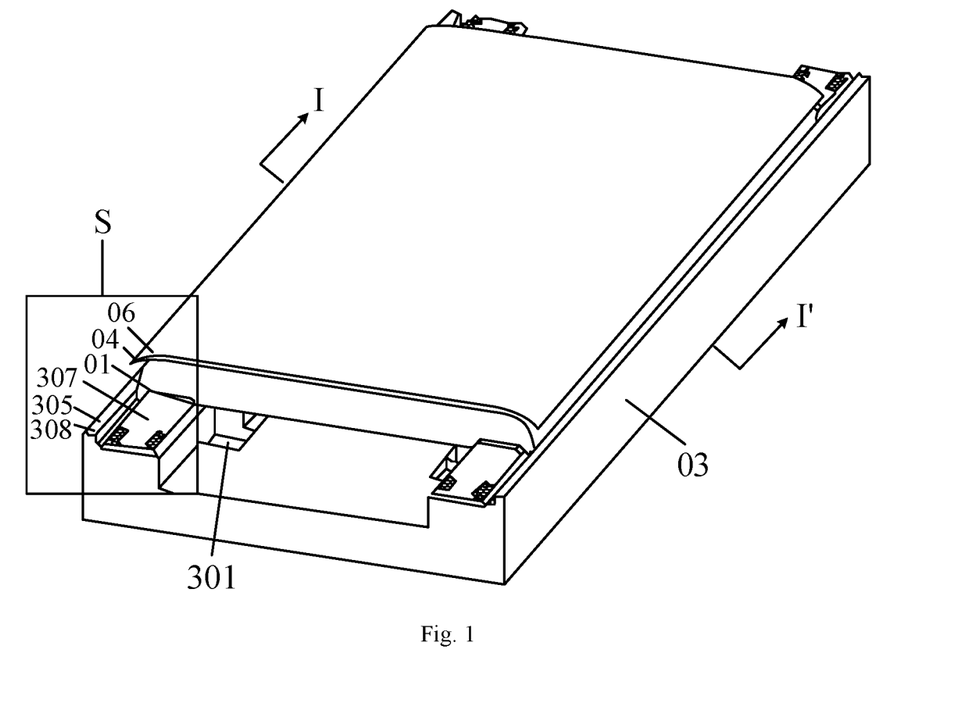
FIG. 1 is a schematic stereoscopic structural diagram of a curved surface lamination apparatus provided by an embodiment of the present disclosure.
Figure 2:
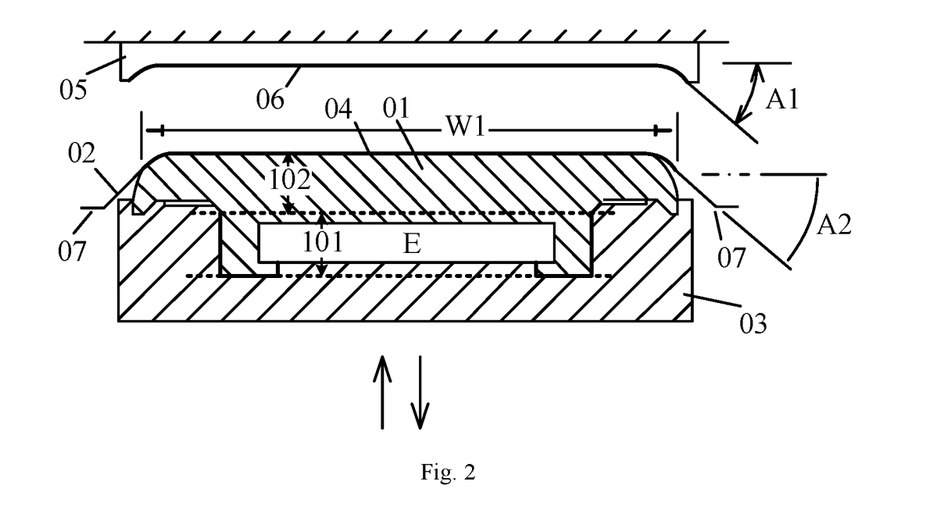
FIG. 2 is a schematic cross-sectional view along I-I' in FIG. 1.

Aiming at the above problem existing in the related art, an embodiment of the present disclosure provides a curved surface lamination apparatus, as shown in FIG. 1 and FIG. 2, including: a profiling jig 01, including: a base 101 and a profiling portion 102, wherein the profiling portion 102 is configured to support a carrier film 02, and a side of the base 101 facing away from the profiling portion 102 has an opening; and a lower jig 03, including: a first sinking groove 301, wherein part of the base 101 is inserted into the first sinking groove 301, such that the lower jig 03 encloses a hollow structure E with the base 101 at a position of the opening.

In the curved surface lamination apparatus provided by the embodiment of the present disclosure, the side of the base 101 of the profiling jig 01 facing away from the profiling portion 102 has the opening, such that the profiling jig 01 and the lower jig 03 may enclose the hollow structure E after assembly. Therefore, an external pressure (also called device load) applied from one side of the lower jig 03 in the lamination process may be diffused to a middle area and four corners of the profiling portion 102 by taking the base 101 on both sides of the hollow structure E as a transmission path, which solves the problems of stress concentration in the middle area and insufficient stress at the four corners of the profiling jig 01. Moreover, since a surface of a carrier film 02 supported by the profiling portion 102 is attached with a flexible panel 04, the overall stress of the flexible panel 04 may also be uniform under a condition that the profiling portion 102 is uniformly stressed, and thus the lamination yield of the flexible panel 04 and a curved surface cover plate 06 is ensured. In addition, since the overall stress of the profiling jig 01 is uniform, it is not necessary to solve the problem of insufficient stress at the four corners by loading a large device load on the lower jig 03, that is, compared with the related art, the required device load in the present disclosure is small.

Specifically, the profiling jig 01 may be made of rubber, silica gel or other materials with high fatigue strength and high resilience.

Figure 3:
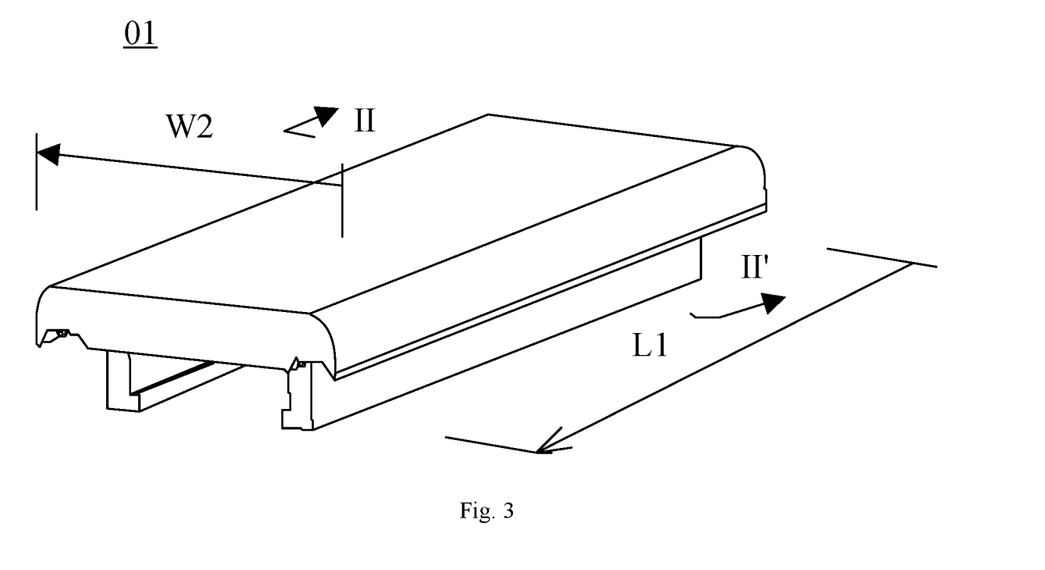
FIG. 3 is a schematic stereoscopic structural diagram of a profiling jig provided by an embodiment of the present disclosure.
Figure 4:
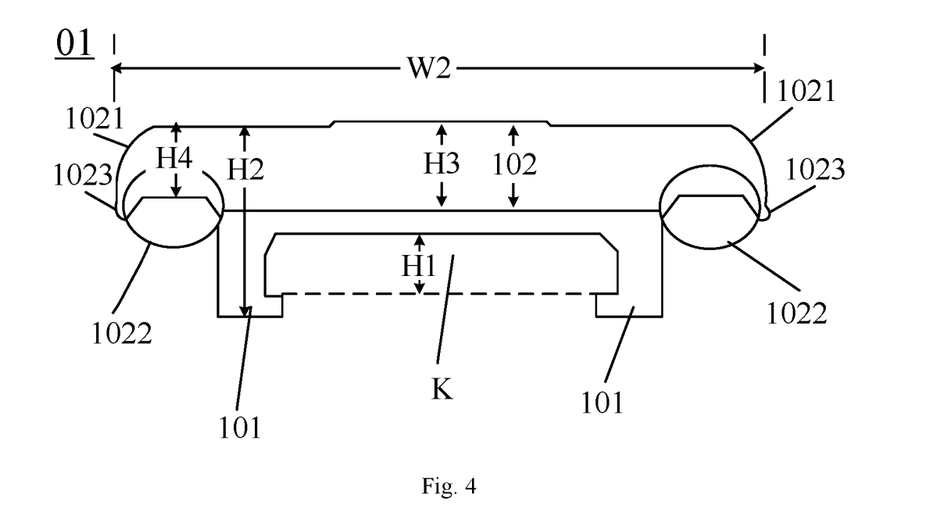
FIG. 4 is a schematic cross-sectional view along II-II' in FIG. 3.
Figure 5:
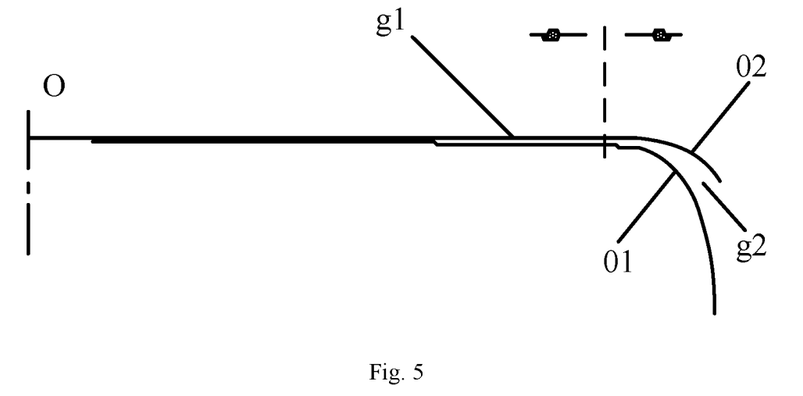
FIG. 5 is a schematic diagram of an outline plane of a profiling jig provided by an embodiment of the present disclosure.

It should be understood that in the above curved surface lamination apparatus provided by the embodiment of the present disclosure, as shown in FIG. 1, FIG. 3 and FIG. 4, in order to ensure a profiling effect of the flexible panel 04 and the profiling jig 01, it needs to be ensured that a width W1 of the flexible panel 04 is smaller than a width W2 of the profiling jig 01, for example, W2=W1+ΔW, where ΔW≥1 mm. In addition, as shown in FIG. 4 and FIG. 5, an outline plane 1021 of the profiling jig 01 needs to meet the situation that from a middle position O of a flat area to an end point position of a bending area, a gap between the outline plane 1021 and the carrier film 02 gradually increases. Specifically, the gap at the middle position O is 0, a gap g1 at a start position of the bending area is in a range of 0.3 mm to 0.5 mm, and a gap g2 at the end point position is greater than g1, which is not specifically limited here. In this way, failure of pulling of the flexible panel 04 attached with the carrier film 02 due to premature contact between the profiling jig 01 and the carrier film 02 can be avoided.

Optionally, in the above curved surface lamination apparatus provided by the embodiment of the present disclosure, in order to make the stress distribution on the outline plane 1021 of the profiling jig 01 uniform, in a direction perpendicular to a plane where the lower jig 03 is located, a ratio of a thickness H1 of the hollow structure E and a thickness H2 of the profiling jig 01 may be set to be in a range of 6:17 to 7:13. Exemplarily, the thickness H1 of the hollow structure E is 6 mm-7 mm, and the thickness of the profiling jig 01 is in a range of 13 mm to 17 mm. Specifically, the thickness H1 of the hollow structure E is 6 mm, 6.5 mm, 7 mm, etc., and the thickness of the profiling jig 01 is 13 mm, 14 mm, 15 mm, 16 mm, 17 mm, etc.

Figure 6:
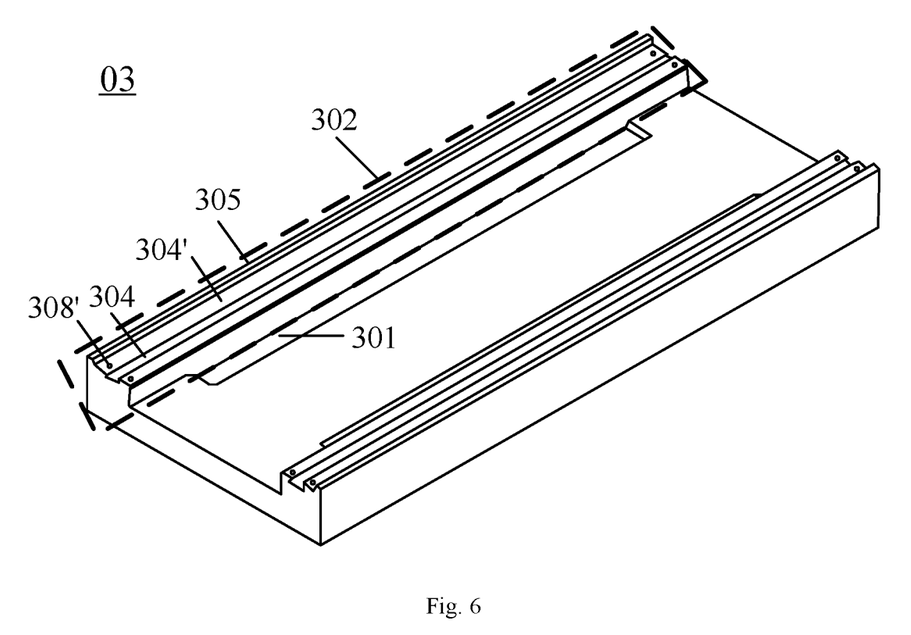
FIG. 6 is a schematic stereoscopic structural diagram of a lower jig provided by an embodiment of the present disclosure.

Optionally, in the above curved surface lamination apparatus provided by the embodiment of the present disclosure, as shown in FIG. 6, the lower jig 03 further includes: a side edge 302 located on one side of a first sinking groove 301 away from a central area of the lower jig 03; and an extension direction of the side edge 302 is the same as an extension direction of the first sinking groove 301, and the side edge 302 is configured to carry the profiling portion 102.

By setting the side edge 302 on the outer side of the first sinking groove 301 to support the part of the profiling portion 102 exceeding the base 101, not only a fixing effect between the lower jig 03 and the profiling jig 01 is enhanced, but also the lamination between the curved surface cover plate 06 and the flexible panel 04 corresponding to the part of the profiling portion 102 exceeding the base 101 is effectively realized under the effects of thrust of the side edge 302 and the pressure of the curved surface cover plate 06 in the lamination process, and the part of the profiling portion 102 exceeding the base 101 is prevented from deforming due to only subjected to the pressure of the curved surface cover plate 06 because of suspension, which affects the lamination effect.

Figure 7:
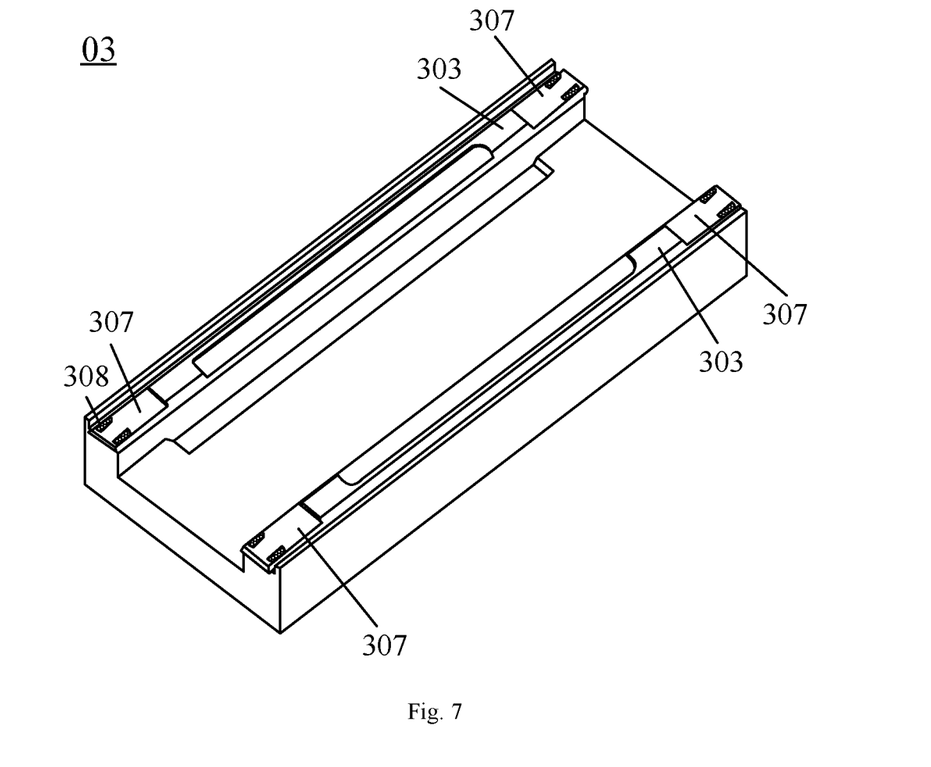
FIG. 7 is another schematic stereoscopic structural diagram of a lower jig provided by an embodiment of the present disclosure.
Figure 8:
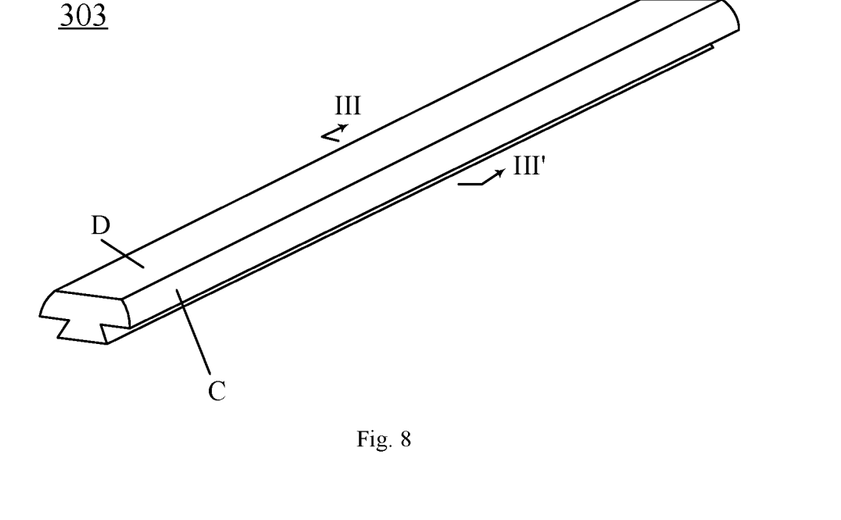
FIG. 8 is a schematic stereoscopic structural diagram of a dovetail edge provided by an embodiment of the present disclosure.
Figure 9:
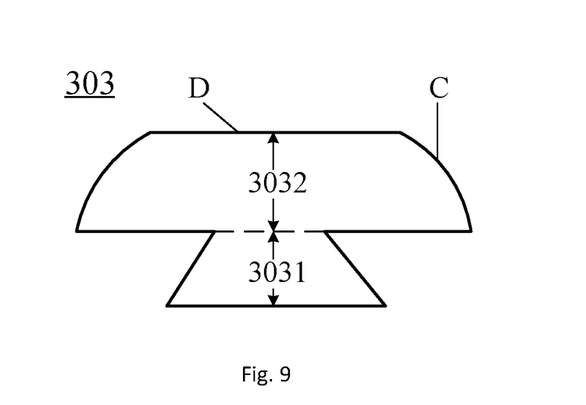
FIG. 9 is a schematic cross-sectional view along in FIG. 8.

Optionally, in the above curved surface lamination apparatus provided by the embodiment of the present disclosure, as shown in FIG. 7 to FIG. 9, the lower jig 03 further includes: a dovetail edge 303, the dovetail edge 303 includes: a first dovetail portion 3031 and a second dovetail portion 3032, and a contact surface between the first dovetail portion 3031 and the second dovetail portion 3032 is smaller than a surface of the first dovetail portion 3031 facing away from the contact surface and is smaller than a surface of the second dovetail portion 3032 facing away from the contact surface.

The side edge 302 includes: a dovetail groove 304 matched with the first dovetail portion 3031, and a defining edge 305 located on one side of the dovetail groove 304 away from the central area of the lower jig 03.

The profiling portion 102 includes: a bending portion exceeding a border of the base 101, and the bending portion includes a first bending portion 1022 matched with the second dovetail portion 3032, and a second bending portion 1023 located on one side of the first bending portion 1022 away from the base 101 and in contact with the defining edge 305, as shown in FIG. 4.

Since the profiling portion 102 has the bending portion exceeding the base 101, in order to realize a good fixing effect on the profiling portion 102, the dovetail edge 303 and the defining edge 305 are arranged in the present disclosure. Moreover, the dovetail edge 303 and the defining edge 305 are matched with each other, which may further effectively limit the deformation of the profiling portion 102 in a width direction (namely, a left-right direction in the figure), and thus abnormal stretching of the flexible panel 04 carried by the profiling portion 102 is avoided. In addition, in order to prevent the dovetail edge 303 from falling off abnormally, a dovetail groove 304 matched with the first dovetail portion 3031 is formed in the side edge 302. In addition, in the present disclosure, matching means that the shapes of the contacting surfaces are the same or similar.

Optionally, in the above curved surface lamination apparatus provided by the embodiment of the present disclosure, in order to avoid abnormal deformation of the profiling portion 102 due to interference forces (such as collision forces during transportation), as shown in FIG. 4, in a direction perpendicular to the plane 03 where the lower jig is located, a ratio of a thickness H3 of the bending portion to a thickness of the profiling jig 01 is in a range of 6:17 to 9:13. Exemplarily, the thickness H3 of the bending portion is in a range of 6 mm to 9 mm, and the thickness of the profiling jig 01 is in a range of 13 mm-17 mm. Specifically, the thickness H3 of the bending portion is 6 mm, 7 mm, 8 mm, 9 mm, etc., and the thickness of the profiling jig 01 is 13 mm, 14 mm, 15 mm, 16 mm, 17 mm, etc.

It needs to be illustrated that, since the bending portion includes a first bending portion 1022 and a second bending portion 1023, the thickness H3 of the bending portion is a greater value between a thickness of the first bending portion 1022 and a thickness of the second bending portion 1023. Specifically, in the present disclosure, the thickness H3 of the bending portion is the thickness of the second bending portion 1023. The thickness H4 of the first bending portion 1022 is in a range of 6 mm-7 mm, such as 6 mm, 6.5 mm, 7 mm, etc.

Optionally, in the above curved surface lamination apparatus provided by the embodiment of the present disclosure, in order to better adjust a size of the stress applied to the profiling jig 01, as shown in FIG. 8 and FIG. 9, the surface of the first dovetail portion 3031 facing away from the contact surface is smaller than the surface of second dovetail portion 3022 facing away from the contact surface.

Optionally, in the above curved surface lamination apparatus provided by the embodiment of the present disclosure, as shown in FIG. 8 and FIG. 9, the second dovetail portion 3032 includes: a plane D facing away from one side of the dovetail groove 304, and side faces C located on two sides of the plane D and extending facing away from the plane in the extension direction of the first sinking groove 301. That is, the second dovetail portion 3032 has a narrow upper and wide lower structure, which may realize a better clamping effect between the second dovetail portion 3032 and the matched first bending portion 1022.

Optionally, in the above curved surface lamination apparatus provided by the embodiment of the present disclosure, the side faces C may be implemented in various ways, such as, inclined faces, cambered faces or other shapes, which is not specifically limited here.

Figure 10:
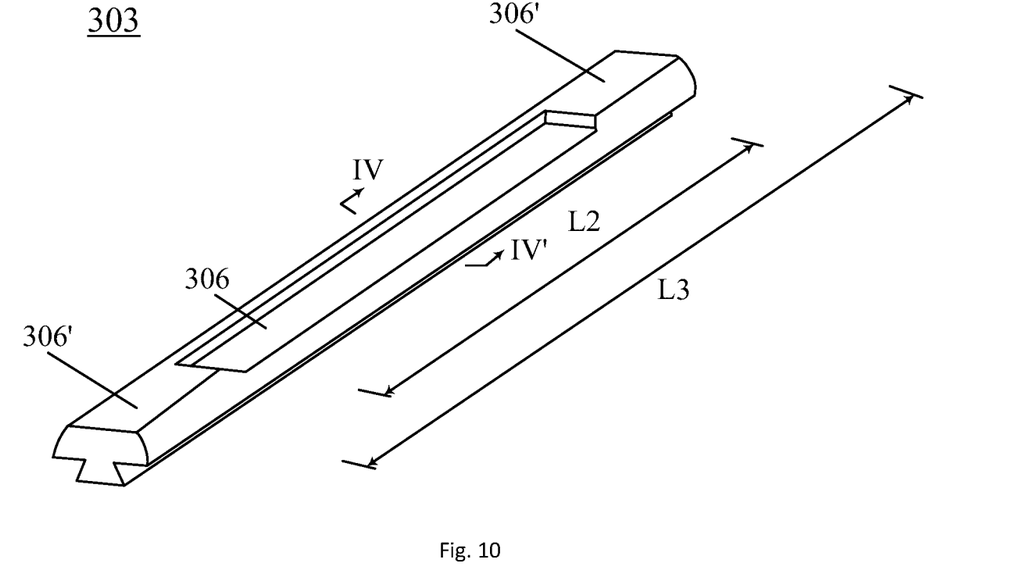
FIG. 10 is another schematic stereoscopic structural diagram of a dovetail edge provided by an embodiment of the present disclosure.
Figure 11:
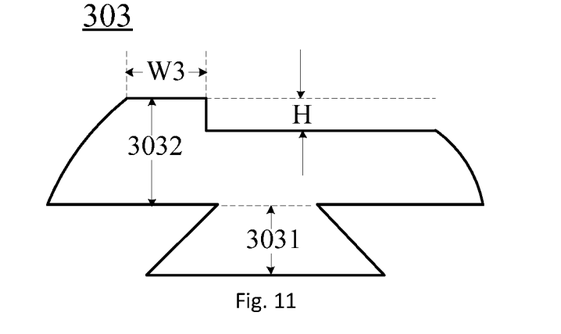
FIG. 11 is a schematic cross-sectional view along IV-IV' in FIG. 10.

Optionally, in the above curved surface lamination apparatus provided by the embodiment of the present disclosure, as shown in FIG. 10 and FIG. 11, the second dovetail portion 3032 includes a second sinking groove 306; and an orthographic projection of second sinking groove 306 on the plane where the lower jig 03 is located partially overlaps with an orthographic projection of the plane D on the plane where the lower jig 03 is located, and partially overlaps with an orthographic projection of the side face C close to the side of the central area of the lower jig 03 on the plane where the lower jig 03 is located.

The second sinking groove 306 is arranged, such that the contact surface between the bending portion and the second dovetail portion 3032 is mainly the outer side face C and an edge area of the plane D connected to the side face C, and thus the edge stress on the bending portion may be adjusted through the second dovetail portion 3032. Specifically, the greater a width W3 of the edge area of the plane is, the greater the contact surface between the bending portion and the second dovetail portion 3032 is, and the smaller the edge stress on the bending portion is. The smaller the width W3 of the edge area of the plane is, the smaller the contact surface between the bending portion and the second dovetail portion 3032 is, and the greater the edge stress on the bending portion is. In addition, a depth H of the second sinking groove 306 is smaller than the thickness of the second dovetail portion 3032, so as to ensure that the first dovetail portion 3031 is firmly clamped to the dovetail groove 304.

Optionally, in the above curved surface lamination apparatus provided by the embodiment of the present disclosure, in order to give consideration to the adjustment of the edge stress on the bending portion and the clamping effect between the first dovetail portion 3031 and the dovetail groove 304, in the extension direction of the first sinking groove 301, a central line of the second dovetail portion 3032 may be away from the central area of the lower jig 03 relative to a central line of the second sinking groove 306.

Optionally, in the above curved surface lamination apparatus provided by the embodiment of the present disclosure, as shown in FIG. 10 and FIG. 11, in the extension direction of the first sinking groove 301, the second sinking groove 306 is located in a middle area of the second dovetail portion 3032, and an extension length L2 of the second sinking groove 306 is smaller than an extension length L3 of the second dovetail portion 3032. In other words, two ends of the second sinking groove 306 are provided with portions of the second dovetail portion 3032 that is not grooved, and in FIG. 10, 306' represents the portions of the second dovetail portion 3032 that is not grooved at the two ends of the second sinking groove 306.

Since the second dovetail portion 3032 is configured to support the bending portion, the second sinking groove 306 is arranged, such that in the extension direction of the first sinking groove 301, the middle area of the bending portion is in contact with the second sinking groove 306, an end area of the bending portion is in contact with the portions of the second dovetail portion 3032 that is not grooved, so that the surface pressure of the end area of the bending portion can be effectively controlled, and the stress on the four corners of the flexible panel 04 is adjusted. Specifically, the longer the second sinking groove 306 is, the smaller the area of the portions of the second dovetail portion 3032 that is not grooved in contact with the end area of the bending portion is, the greater the stress of the end area of the bending portion is, and correspondingly, the greater the stress on the four corners of the flexible panel 04 is. The shorter the second sinking groove 306 is, the larger the area of the portions of the second dovetail portion 3032 that is not grooved in contact with the end area of the bending portion is, the smaller the stress of the end area of the bending portion is, and correspondingly, the smaller the stress on the four corners of the flexible panel 04 is.

Figure 12:
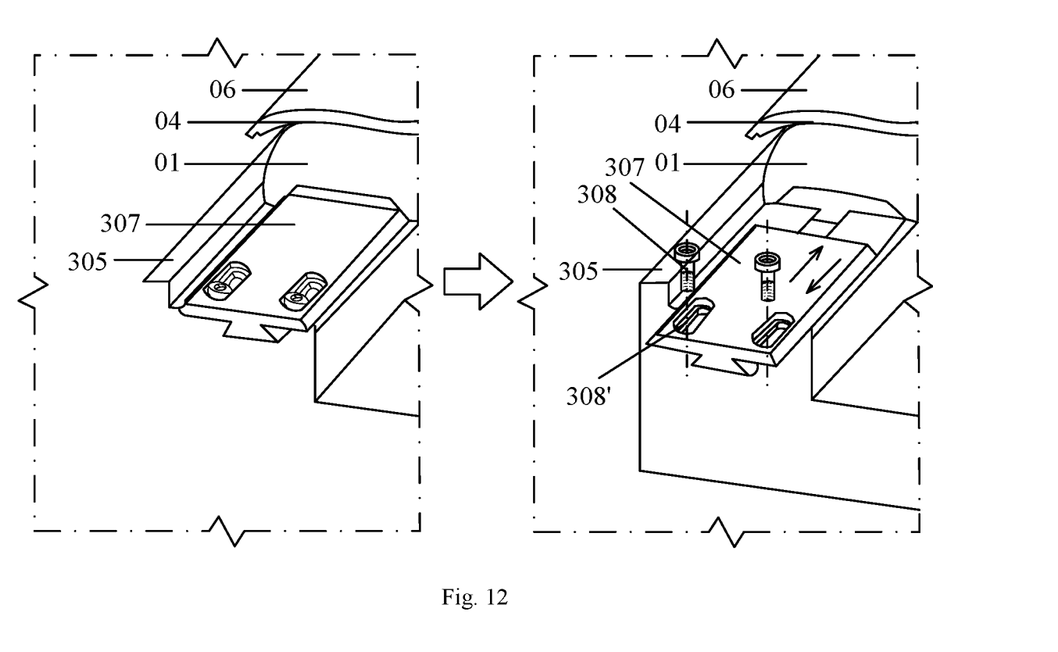
FIG. 12 is a schematic enlarged structural diagram of an S area in FIG. 1.

Optionally, in the above curved surface lamination apparatus provided by the embodiment of the present disclosure, as shown in FIG. 7 and FIG. 12, the lower jig 03 further includes: a first sliding top block 307.

In the extension direction of the first sinking groove 301, the first sliding top block 307 is located at two ends of the dovetail groove 304 and in contact with the dovetail edge 303.

The setting of the first sliding top block 307 can effectively limit the degree of freedom of the dovetail edge 303 in a length direction. Specifically, as shown in FIG. 6, FIG. 7 and FIG. 12, the first sliding top block 307 may be fixed to the side edge 302 through a fixed bolt 308, so as to constrain the displacement of the dovetail edge 303 in directions in addition to the length direction. At this time, the side edge 302 has a threaded hole 308' corresponding to the fixed bolt 308. Specifically, an orthographic projection of the profiling jig 01 on the plane where the lower jig 03 is located does not overlap with an orthographic projection of first sliding top block 307 on the plane where the lower jig 03 is located and an orthographic projection of fixed bolt 308 on the plane where the lower jig 03 is located.

Optionally, in the above curved surface lamination apparatus provided by the embodiment of the present disclosure, the dovetail edge 303 is detachably connected to the dovetail groove 304.

Since the size of the profiling jig 01 required by the flexible panel 04 of different sizes is different, the size of the dovetail edge 303 required to fix the profiling jig 01 may also be different accordingly. Therefore, the dovetail edge 303 is detachably connected to the dovetail groove 304, and the lamination of different products can be well realized by replacing the dovetail edge 303 of different sizes.

Optionally, in the above curved surface lamination apparatus provided by the embodiment of the present disclosure, as shown in FIG. 7, the lower jig 03 further includes: a second sliding top block (not shown in figure).

In the extension direction of the first sinking groove 301, the second sliding top block 309 is located at two ends of the first sinking groove 301 and in contact with the base 101.

The setting of the second sliding top block can effectively limit the degree of freedom of the profiling jig 01 in a length direction (namely, the extension direction of the first sinking groove 301). Specifically, the second sliding top block is fixed to the lower jig 03 through the fixed bolt, and at this time, a threaded hole corresponding to the fixed bolt is formed in the lower jig 03.

Figure 13:
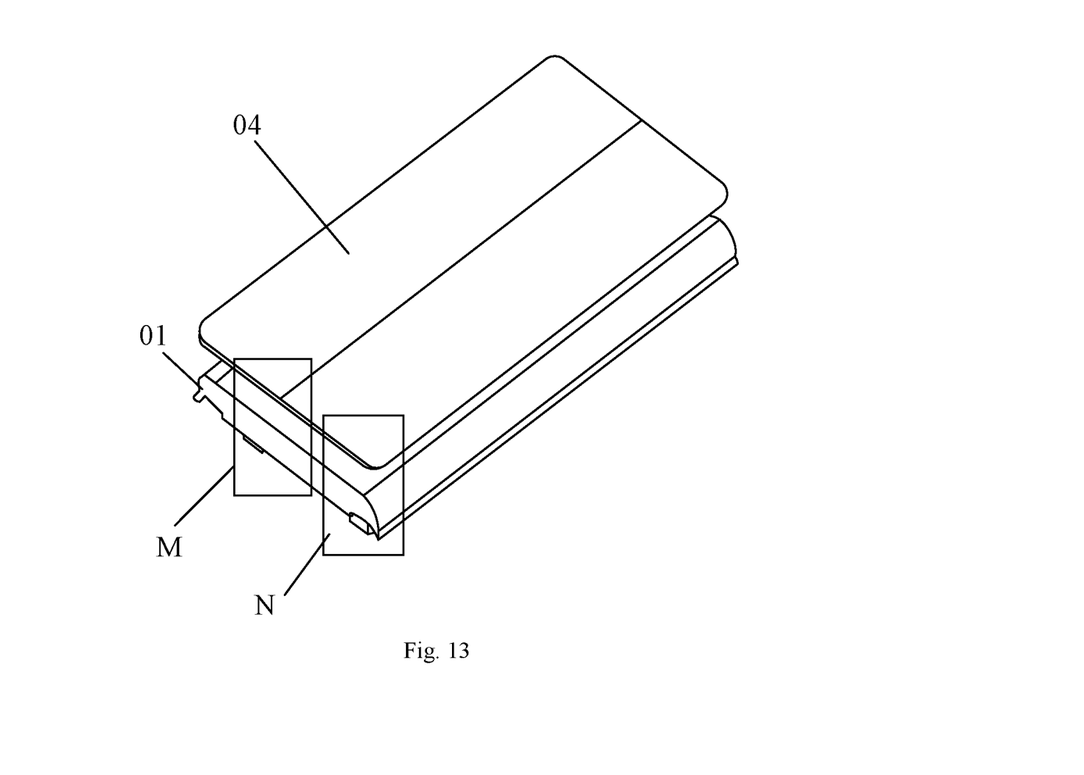
FIG. 13 is a schematic diagram of a relative position relationship between a flexible panel and a profiling jig provided by an embodiment of the present disclosure.

In the related art, as shown in FIG. 13, four corner positions N of the flexible panel 04 are overflowed due to extrusion of the profiling jig 01, and the corner positions are prone to crack due to the concentrated bending force. Therefore, the profiling jig 01 needs to be designed with avoidance at the corner positions. The following methods may be used for avoidance design.

Figure 14:
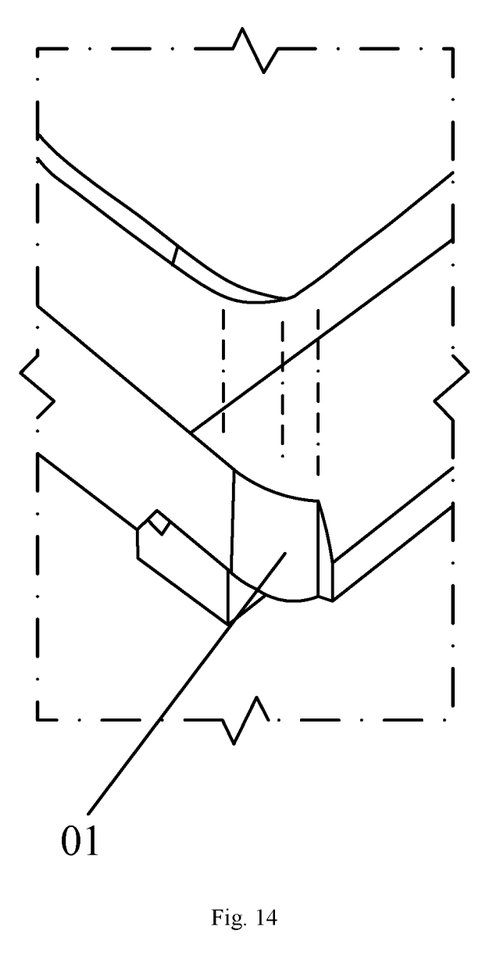
FIG. 14 is a schematic diagram of a four-corner avoidance structure of a profiling jig provided by an embodiment of the present disclosure.

First, an orthographic projection of the profiling jig 01 on a plane where the lower jig 03 is located is set to be reduced inwards by a first distance, such as in a range of 1 mm-3 mm, and specifically may be 1 mm, 2 mm, 3 mm, etc., as shown in FIG. 14, relative to an orthographic projection of the flexible panel 04 on a plane where the lower jig 03 is located.

Figure 15:
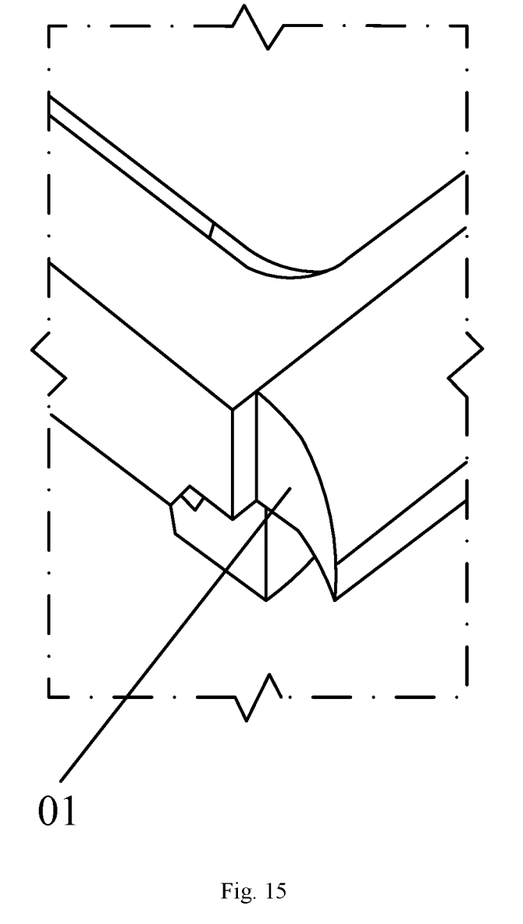
FIG. 15 is another schematic diagram of a four-corner avoidance structure of a profiling jig provided by an embodiment of the present disclosure.
Figure 16:
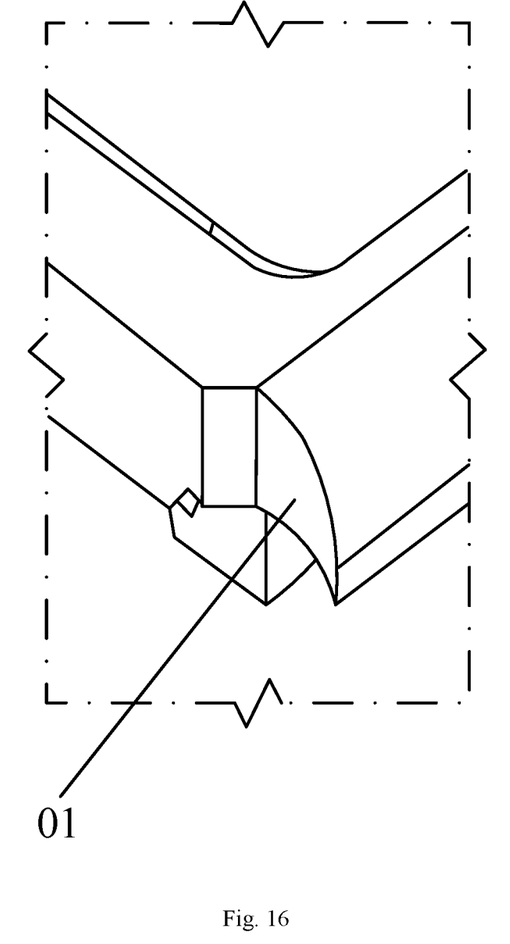
FIG. 16 is yet another schematic diagram of a four-corner avoidance structure of a profiling jig provided by an embodiment of the present disclosure.

Second, in an extension direction of the first sinking groove 301, the bending portion is set to be reduced inwards by a second distance relative to the base 101, and specifically, an end with a length of the second distance may be cut off from a start position of the bending portion, as shown in FIG. 15; or after cutting off the end, a tangent plane of the profiling portion 102 flush with a border of the base 101 is chamfered, as shown in FIG. 16. Exemplarily, the second distance is in a range of 1 mm-3 mm, and specifically may be 1 mm, 2 mm, 3 mm, etc.

Figure 17:
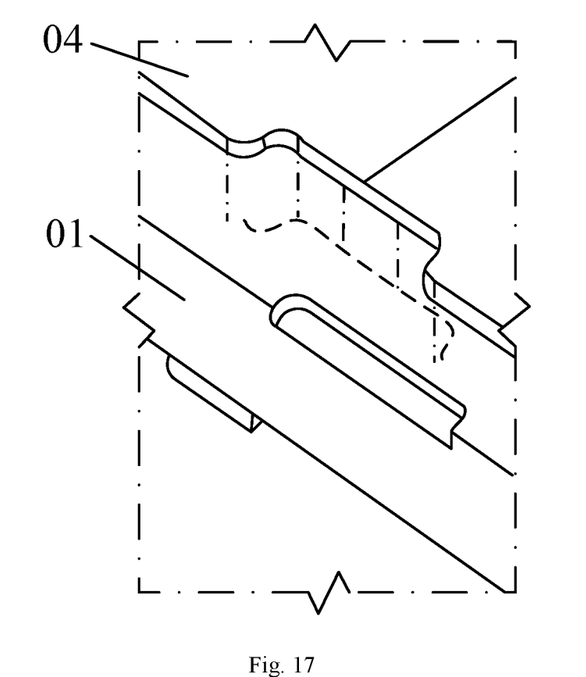
FIG. 17 is a schematic diagram of an irregular-shaped area avoidance structure of a profiling jig provided by an embodiment of the present disclosure.
Figure 18:
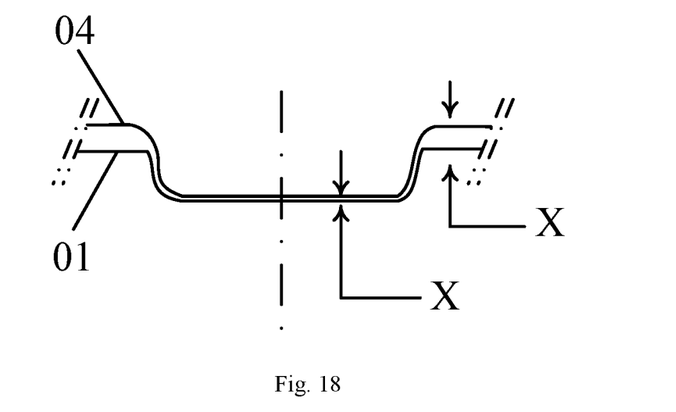
FIG. 18 is a schematic diagram of a projection relationship between the profiling jig and the flexible panel in the irregular-shaped area shown in FIG. 17.
Figure 19:
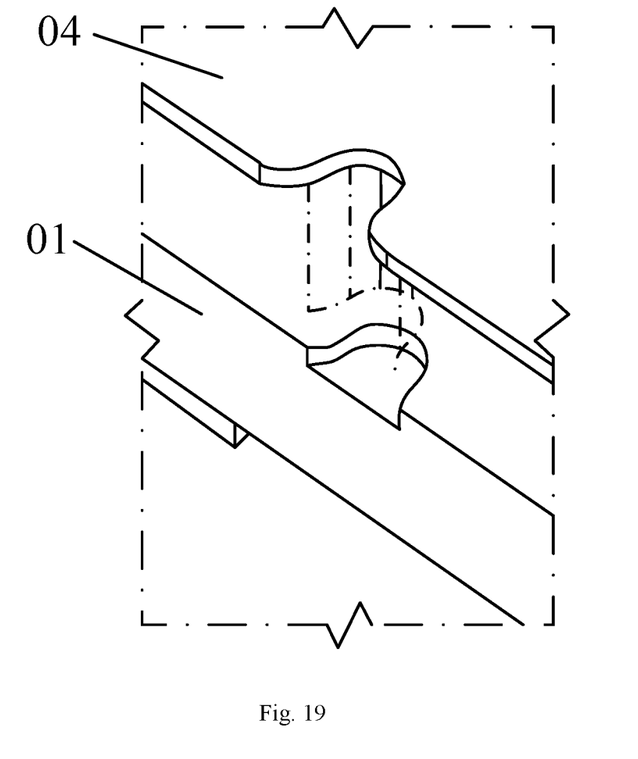
FIG. 19 is another schematic diagram of an irregular-shaped area avoidance structure of a profiling jig provided by an embodiment of the present disclosure.
Figure 20:
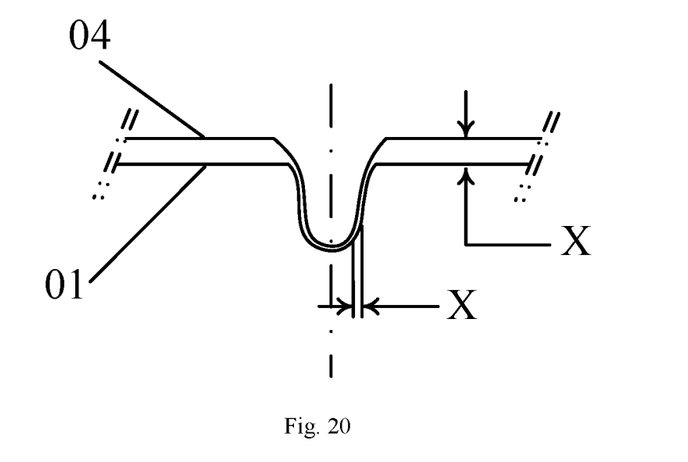
FIG. 20 is a schematic diagram of a projection relationship between the profiling jig and the flexible panel in the irregular-shaped area shown in FIG. 19.

In addition, as shown in FIG. 13, in the related art, the flexible panel 04 often has a design of an irregular-shaped area M (such as a fringe screen and a water drop screen) at a top end, in the lamination process, a protective film of the irregular-shaped area is often stuck because the profiling jig 01 deforms and extrudes the carrier film 02, resulting in poor lamination. Therefore, the profiling jig 01 here needs to be designed to avoid the irregular-shaped area. Specifically, an irregular-shaped groove may be arranged on the profiling jig 01, and an orthographic projection of the irregular-shaped groove on the plane where the lower jig 03 is located is expanded outwards by a third distance X (such as in a range of 0.2 mm-0.3 mm, specifically may be 0.2 mm, 0.25 mm, 0.3 mm, etc.) compared with an orthographic projection of the irregular-shaped area of the flexible panel 04 on the plane where the lower jig 03 is located, as shown in FIG. 17 to FIG. 20. Specifically, the flexible panel 04 corresponding to FIG. 17 and FIG. 18 is a fringe P screen, and the flexible panel 04 corresponding to FIG. 19 and FIG. 20 is a water drop screen.

It needs to be illustrated that, the values of the first distance, the second distance and the third distance X are only given exemplarily, during specific implementation, the values of the first distance, the second distance and the third distance X need to be flexibly adjusted according to product design, which are not limited to the above range of values.

Optionally, the above curved surface lamination apparatus provided by the embodiment of the present disclosure, as shown in FIG. 2, further includes: an upper jig 05, configured to fix a curved surface cover plate 06, and the curved surface cover plate 06 is used for being laminated with the flexible panel 04.

The curved surface cover plate 06 may be a glass cover plate, and the upper jig 05 may fix the curved surface cover plate 06 by vacuum adsorption combined with short side clamping.

Optionally, the above curved surface lamination apparatus provided by the embodiment of the present disclosure, as shown in FIG. 2, further includes: the carrier film 02, configured to attach the flexible panel 04, wherein an initial bending angle A2 of the carrier film 02 is greater than a bending angle A1 of the curved surface cover plate 06.

Specifically, the carrier film 02 may be stretched through a clamp 07 linked with an air cylinder to control the carrier film 02 to pre-bend to a certain angle, that is, the initial bending angle A2 of the carrier film 02 is obtained. In addition, the initial bending angle A2 of the carrier film 02 is set to be greater than the bending angle A1 of the curved surface cover plate 06, so that the situation that a bending area of the flexible panel 04 is in contact with the curved surface cover plate 06 prior to a flat area of the flexible panel 04, which causes bubbles, cracks and other badness can be avoided, and the lamination yield is improved.

Specifically, a method for lamination with the above curved surface lamination apparatus provided by the embodiment of the present disclosure is as follows.

Step 1, the upper jig 05 fixes the curved surface cover plate 06 by means of negative pressure adsorption combined with short side clamping, wherein a surface of the upper jig 05 in contact with the curved surface cover plate 06 is the same or similar to the shape of the curved surface cover plate 06, the upper jig 05 is bent to form an accommodation space, and the curved surface cover plate 06 is fixed into the accommodation space.

Step 2, the profiling jig 01 and the lower jig 03 are assembled, and the profiling portion 102 of the profiling jig 01 is adopted to support the carrier film 02.

Step 3, a flexible module is attached to the carrier film 02; and exemplarily, one side of the carrier film 02 in contact with the flexible panel 04 may be attached by a visbreaking adhesive, such that adhesion of the visbreaking adhesive can be greatly reduced through ultraviolet irradiation subsequently, and the carrier film 02 is conveniently peeled off from the flexible panel 04.

Step 4, the carrier film 02 is stretched by the clamp 07 linked with the air cylinder, such that an initial bending angle A2 is formed, and the initial bending angle A2 is greater than or equal to a bending angle A1 of the curved surface cover plate 06.

Step 5, the lower jig 03 and the profiling jig 01 are driven to move to the curved surface cover plate 06, so as to drive the carrier film 02 and the flexible panel 04 into the accommodation space, and then a flat area of the flexible panel 04 is attached to a flat area of the curved surface cover plate 06, and a pressure is kept for several seconds; and specifically, a hydraulic column may provide power to realize up-down translation of the lower jig 03 and the profiling jig 01.

Step 6, the lower jig 03 and the profiling jig 01 are continuously driven to move to the curved surface cover plate 06, so as to control the profiling jig 01 to bend and deform under a thrust of the lower jig 03 and a pressure of the curved surface cover plate 06, and drive the carrier film 02 and two ends of the flexible panel 04 to bend and deform correspondingly, such that a bending area of the flexible panel is attached to a bending area of the curved surface cover plate 06, and the pressure is kept for several seconds.

Step 7, the lower jig 03 and the profiling jig 01 are driven to move away from the curved surface cover plate 06.

Step 8, the carrier film 02 are peeled off from the flexible panel 04.

So far, the lamination of the flexible panel 04 and the curved surface cover plate 06 is completed.

The curved surface lamination apparatus provided by the embodiment of the present disclosure, includes: the profiling jig, including the base and the profiling portion, with the profiling portion being configured to support the carrier film, and the side of the base facing away from the profiling portion having the opening; and the lower jig, including the first sinking groove, with part of the base being inserted into the first sinking groove, such that the lower jig encloses the hollow structure with the base at a position of the opening. The side of the base of the profiling jig facing away from the profiling portion has the opening, such that the profiling jig and the lower jig may enclose the hollow structure after assembly. Therefore, the external pressure applied from one side of the lower jig in the lamination process may be diffused to a middle area and four corners of the profiling portion by taking the base on both sides of the hollow structure as a transmission path, which solves the problems of stress concentration in the middle area and insufficient stress at the four corners of the profiling jig. Moreover, since the surface of the carrier film supported by the profiling portion is attached with the flexible panel, the overall stress of the flexible panel may also be uniform under a condition the profiling portion is uniformly stressed, and thus the lamination yield of the flexible panel and the curved surface cover plate is ensured.

Apparently, those skilled in the art can perform various changes and modifications on the embodiments of the disclosure without departing from the spirit and scope of the embodiments of the disclosure. Therefore, if these changes and modifications on the embodiments of the disclosure fall in the scope of the claims of the disclosure and their equivalent technologies, the disclosure is intended to include these changes and modifications.

What is claimed is:

1. A curved surface lamination apparatus, comprising:
   a profiling jig, comprising: a base and a profiling portion, wherein the profiling portion is configured to support a carrier film and comprises: a bending portion exceeding a border of the base, and a side of the base facing away from the profiling portion has an opening; and
   a lower jig, comprising: a first sinking groove, a dovetail edge and a side edge on one side of the first sinking groove away from a central area of the lower jig, wherein part of the base is inserted into the first sinking groove, such that the lower jig encloses a hollow structure with the base at a position of the opening;
   wherein an extension direction of the side edge is the same as an extension direction of the first sinking groove, and the side edge is configured to carry the profiling portion;
   wherein the dovetail edge comprises: a first dovetail portion and a second dovetail portion, wherein a contact surface between the first dovetail portion and the second dovetail portion is smaller than a surface of the first dovetail portion facing away from the contact surface and is smaller than a surface of the second dovetail portion facing away from the contact surface;
   the side edge comprises: a dovetail groove matched with the first dovetail portion, and a defining edge on one side of the dovetail groove away from the central area of the lower jig; and
   wherein the bending portion comprises a first bending portion matched with the second dovetail portion, and a second bending portion on one side of the first bending portion away from the base and being in contact with the defining edge.

2. The curved surface lamination apparatus according to claim 1, wherein in a direction perpendicular to a plane where the lower jig is located, a ratio of a thickness of the hollow structure to a thickness of the profiling jig is in a range of 6:17 to 7:13.

3. The curved surface lamination apparatus according to claim 1, wherein in a direction perpendicular to a plane where the lower jig is located, a ratio of a thickness of the bending portion to a thickness of the profiling jig is in a range of 6:17 to 9:13.

4. The curved surface lamination apparatus according to claim 1, wherein the surface of the first dovetail portion facing away from the contact surface is smaller than the surface of the second dovetail portion facing away from the contact surface.

5. The curved surface lamination apparatus according to claim 1, wherein the second dovetail portion comprises a plane facing away from one side of the dovetail groove, and side faces on two sides of the plane in the extension direction of the first sinking groove and extending away from the plane.

6. The curved surface lamination apparatus according to claim 5, wherein the side faces are inclined faces or cambered faces.

7. The curved surface lamination apparatus according to claim 5, wherein the second dovetail portion comprises a second sinking groove; and
   an orthographic projection of the second sinking groove on the plane where the lower jig is located partially overlaps with an orthographic projection of the plane of the second dovetail portion on the plane where the lower jig is located, and partially overlaps with an orthographic projection of the side face close to the side of the central area of the lower jig on the plane where the lower jig is located.

8. The curved surface lamination apparatus according to claim 7, wherein in the extension direction of the first sinking groove, a central line of the second dovetail portion is away from the central area of the lower jig relative to a central line of the second sinking groove.

9. The curved surface lamination apparatus according to claim 7, wherein in the extension direction of the first sinking groove, the second sinking groove is in a middle area of the second dovetail portion, and an extension length of the second sinking groove is smaller than an extension length of the second dovetail portion.

10. The curved surface lamination apparatus according to claim 9, wherein the lower jig further comprises: a first sliding top block; and in the extension direction of the first sinking groove, the first sliding top block is at two ends of the dovetail groove and in contact with the dovetail edge.

11. The curved surface lamination apparatus according to claim 10, wherein the lower jig further comprises: a fixed bolt, and the fixed bolt is configured to fix the first sliding top block to the side edge; and an orthographic projection of the profiling jig on the plane where the lower jig is located does not overlap with an orthographic projection of the first sliding top block on the plane where the lower jig is located and an orthographic projection of the fixed bolt on the plane where the lower jig is located.

12. The curved surface lamination apparatus according to claim 1, wherein an orthographic projection of the profiling jig on the plane where the lower jig is located is reduced inwards by a first distance relative to an orthographic projection of a flexible panel on the plane where the lower jig is located.

13. The curved surface lamination apparatus according to claim 12, wherein the first distance is in a range of 1 mm-3 mm.

14. The curved surface lamination apparatus according to claim 1, wherein in the extension direction of the first sinking groove, the bending portion is reduced inwards by a second distance relative to the base.

15. The curved surface lamination apparatus according to claim 14, wherein the second distance is in a range of 1 mm-3 mm.

16. The curved surface lamination apparatus according to claim 1, wherein the lower jig further comprises: a second sliding top block; and in the extension direction of the first sinking groove, the second sliding top block is at two ends of the first sinking groove and in contact with the base.

17. The curved surface lamination apparatus according to claim 1, wherein the profiling jig comprises: an irregular-shaped groove; and an orthographic projection of the irregular-shaped groove on the plane where the lower jig is located is expanded outwards by a third distance compared with an orthographic projection of an irregular-shaped area of a flexible panel on the plane where the lower jig is located.

18. The curved surface lamination apparatus according to claim 17, wherein the third distance is in a range of 0.2 mm-0.3 mm.

19. The curved surface lamination apparatus according to claim 1, wherein the dovetail edge is detachably connected to the dovetail groove.

20. The curved surface lamination apparatus according to claim 1, further comprising: an upper jig, configured to fix a curved surface cover plate, wherein the curved surface cover plate is used for being laminated with the flexible panel.

* * * * *